US006623828B1

(12) United States Patent
Ro

(10) Patent No.: US 6,623,828 B1
(45) Date of Patent: *Sep. 23, 2003

(54) OPTICAL DISK EMPLOYING INTEGRAL SUBSTRATE, AND METHOD FOR MANUFACTURING THE SAME

(75) Inventor: Myong-do Ro, Kyungki-do (KR)

(73) Assignee: Samsung Electronics Co., Ltd. (KR)

(*) Notice: Subject to any disclaimer, the term of this patent is extended or adjusted under 35 U.S.C. 154(b) by 227 days.

This patent is subject to a terminal disclaimer.

(21) Appl. No.: 09/690,830

(22) Filed: Oct. 18, 2000

Related U.S. Application Data

(63) Continuation-in-part of application No. 08/591,978, filed on Jan. 29, 1996, now Pat. No. 6,150,000.

(30) Foreign Application Priority Data

Jan. 28, 1995 (KR) .............................................. 95-1802

(51) Int. Cl.[7] ............................................ G11B 11/105
(52) U.S. Cl. .................... 428/64.2; 428/64.3; 428/64.4; 428/64.7; 428/694 ML; 428/694 RL; 428/694 DE; 428/694 AH; 428/694 SG
(58) Field of Search .............................. 428/64.2, 64.3, 428/64.4, 64.7, 694 ML, 694 RL, 694 DE, 694 AH, 694 SG

(56) References Cited

U.S. PATENT DOCUMENTS 5,846,625 A * 12/1998 Terao et al. ................ 428/64.1
6,106,919 A * 8/2000 Lee et al. ................... 428/64.1
6,301,200 B1 * 10/2001 Aspen et al. ................. 369/13
6,410,115 B1 * 6/2002 Tsai et al. ................... 428/64.1

FOREIGN PATENT DOCUMENTS

JP  01 130346  * 5/1989

* cited by examiner

Primary Examiner—Stevan A. Resan
(74) Attorney, Agent, or Firm—Burns, Doane, Swecker & Mathis, L.L.P.

(57) ABSTRACT

An optical disk, which comprises: a common integral substrate having grooves and/or pits formed on its both sides: and a film structure on at least one side of the integral substrate. They are manufactured by preparing two stampers; simultaneously forming grooves and pits on both sides of an integral substrate by use of said two stampers mounted on a respective fixed mold and moving mold; and forming the film structure on at least one side of said integral substrate by depositing material from targets suspended to both sides of said integral substrate. The disks are superior in mechanical properties and reliability. As for reliability, the present optical disk is prepared without using a bonding process, which overcomes the problem of adhesive out-flow. The presence of only one integral substrate brings about an increased data storage density, twice as much per substrate, while contributing to the lightness of disk and accompanied by various effects including reduction in access time, saving of the bonding process and time in the spin coating, and cost reduction.

24 Claims, 4 Drawing Sheets

OPTICAL DISK EMPLOYING INTEGRAL SUBSTRATE, AND METHOD FOR MANUFACTURING THE SAME

This application is a Continuation-in-Part Application of U.S. application Ser. No. 08/591,978 filed Jan. 29, 1996. now U.S. Pat. No. 6,150,000.

This application claims priority under 35 U.S.C. §§ 119 and/or 365 to 95-1802 filed in Korea on Jan. 28, 1995; the entire content of which is hereby incorporated by reference.

BACKGROUND OF THE INVENTION

1. Field of the Invention

The present invention relates, in general, to a novel optical disk and, more particularly, to the use of an integral substrate to form an optical disk, which has pits and/or grooves formed on the opposite surfaces, without junction parts, thereby obtaining an improvement in reliability and mechanical properties of the resulting substrate at a reduced cost. Also, the present invention is concerned with a method for manufacturing the optical disk.

2. Description of the Prior Art

As society becomes more and more information-intensive, it produces an enormous quantity of various information every. Thus recording media with higher data storage density, higher data transfer rate and longer data archival capability are necessary to cope with this information explosion. Further, recording media are required to be of high recording sensitivity with consideration of the margin between drives of different electromagnetic machines. In response to these needs, optical recording media were created and, since their creation, have been continuously developed.

Among the optical recording media are a magneto-optical disk (hereinafter referred to as "MOD"), a super density disk (hereinafter referred to as "SD"), a Random Access Memory (hereinafter referred to as "RAM"), a Digital Versatile Disc (hereinafter referred to as "DVD"), a Mini Disc (hereinafter referred to as "MD"), a Digital Versatile Disc-Rerecordable (hereinafter referred to as "DVD–RW"), a Digital Versatile Disc Rewritable (hereinafter referred to as "DVD+RW") and a Digital Versatile Disc-Recordable (hereinafter referred to as "DVD–R"). MOD is capable of recording and reading data by forming a magnetic layer, on, a substrate, whereas SD is incapable of rewriting the information stored because they are formed with a stamper during a mastering process, and when making stamper, data is recorded in pits without a recording layer.

SD's have recently come into the spotlight in recording media markets not only because they have 10 to 600 times higher recording density as a magnetic recording medium, but also because information can be stored semi-permanently in them by virtue of non-contacting recording/reproducing manner between a head and the medium.

In order to better understand the background of the invention, a description of conventional MOD and SD will be given below, in connection with some drawings.

Referring to FIG. 5, there is depicted a conventional MOD of double-sided structure that is prepared by bonding two identical subunits to each other using a hot melt bonding layer 50. Each subunit has a polycarbonate substrate 20a and 20b, one side of which is covered with a hard coating protective film 60a and 60b and the other side of which has a tetralayer arrangement. The tetralayer arrangement includes a first dielectric film 21 and 25, a magnetic recording film 22 and 26, a second dielectric film 23 and 27, and a reflective film 24 and 28 protected by a seal coating film 29 is formed.

With reference to FIG. 7, there is depicted a structure of a conventional SD. Like the conventional MOD, the SD has two identical subunits, each having a substrate 71 and 77 on which a semi-transparent film 72 and a reflective film 76 and a seal coating film 73 and 75 are sequentially formed. These subunits are symmetrically arranged with an UV bonding layer 74 interposed therebetween.

Referring to FIG. 3, there is shown a conventional manufacturing process for a substrate of a MOD. As shown in this figure, a substrate 2 is manufactured through injection molding. In this process, only a stamper 3 is mounted on a fixed mold 4 and forms pits and grooves on one side of the substrate 2, which is in direct contact with a movable mold 1. With this polycarbonate substrate, the tetralayer arrangement and the protective layer are formed for MOD and the bilayer arrangement for SD.

The substrate of the conventional MOD or SD should undergo film-forming processes for the tetra- or bilayer arrangement, a spin coating process for the protective film and the bonding process for junction of two subunits. In the course of these processes, there is a strong possibility that the mechanical properties of the substrates may be degraded. This is highly apt to cause a problem in rotating the disk at a high rate which relates to data transfer rate.

The bonding of the two subunit disks can be usually achieved through use of a hot melt adhesive or UV setting resin. When a hot melt adhesive is used, a protective film made of hard coating resin, which plays a role in preventing flaws on the recording side of the polycarbonate substrate, is formed. In this case, the hot melt adhesive on the protective film may flow out and stick to the cartridge, giving rise to a serious problem in reliability. In the latter case, the UV setting resin is coated and exposed to be cured, which saves time. However, there occurs a problem in that, since the UV setting resin may flow out of the margin, it is required to be trimmed.

SUMMARY OF THE INVENTION

It is an object of the present invention to overcome the above problems encountered in prior art and to provide an integral substrate the opposite sides of which are molded through an injection molding process, thereby saving the adhesive process using a hot melt adhesive or UV setting resin.

It is another object of the present invention to provide an optical disk which employs the integral substrate.

It is a further object of the present invention to provide a method for manufacturing the optical disk, using the integral substrate.

Intensive research repeated by the present inventors aiming to develop an optical disk, which is significantly improved in reliability and production cost, has resulted in finding that one integral substrate, on both sides of which grooves and/or pits can be formed, is sufficient to design an optical disk structure.

In accordance with an aspect of the present invention, there is provided an integral substrate for an optical disk, possibly having grooves and/or pits on both of its sides, without junction parts at its center.

In accordance with another aspect of the present invention, there is provided an optical disk, comprising an integral substrate possibly having grooves and/or pits formed on both sides, and a stack structure, comprising a reflective film, a first dielectric film, an optical recording film, a second dielectric film and a protective layer which are, in sequence, laminated on at least one side of said integral substrate.

In accordance with still a further aspect of the present invention, there is provided a method for manufacturing an optical disk, comprising the steps of: preparing two stampers; forming grooves and/or pits on one or simulaneouly on both sides of an integral substrate, by use of said two stampers mounted on a fixing mold and a moving mold, respectively; and forming a film structure on at least one side of said integral substrate, by depositing targets suspended on at least one side of said integral substrate.

BRIEF DESCRIPTION OF THE DRAWINGS

The above objects and other features and advantages of the present invention will be more apparent from the following detailed description taken with reference to the accompanying drawings, in which.

DETAILED DESCRIPTION OF THE INVENTION

The preferred embodiments of the present invention are best understood with reference to the accompanying drawing.

Figure 4:
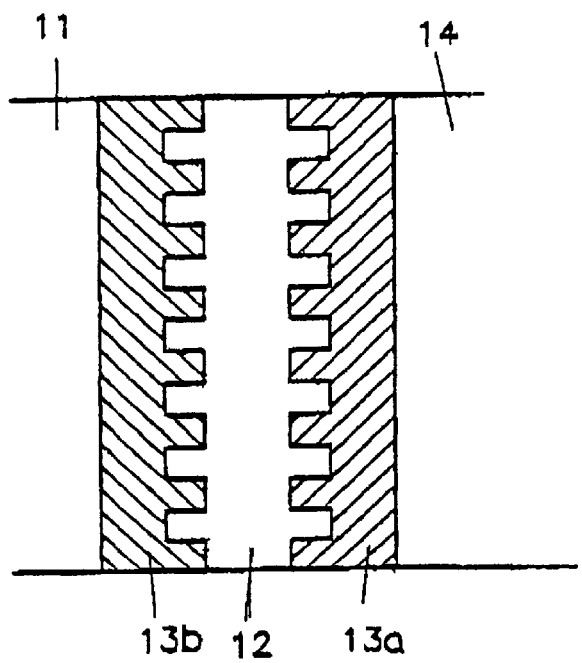
FIG. 4 is a schematic cross sectional view showing a substrate for an optical disk prepared by an injection molding process, according to the present invention.
Figure 5:
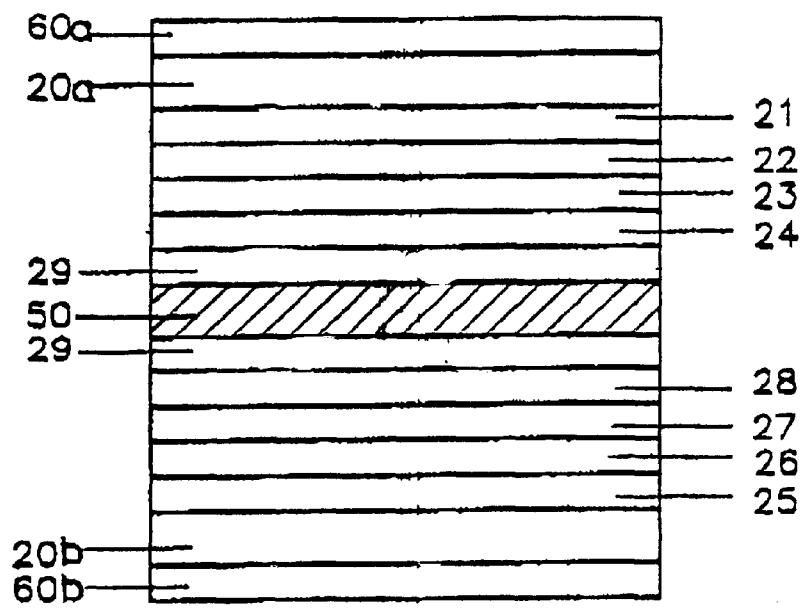
FIG. 5 is a schematic diagram showing the structure of a conventional magneto-optical disk.

With reference to FIG. 4, there is shown a manufacturing process for a substrate, according to the present invention. As shown in this figure, a substrate 12 is manufactured by injecting polycarbonate resin between two stampers 13a and 13b which are mounted on two molds, fixed mold 14 and moving mold 14. Stamper 13b mounted on moving mold 11 may be a dummy i.e., bearing no information content; A substrate having information on one side can be prepared by using such a dummy stamper. Even though stamper 13b is dummy, two stampers 13a and 13b are mounted on two molds and thus it can make the surface materials and conditions the same. This makes the flow of resin smooth upon injection molding to improve the roughness of both or one of substrates. As a result, it decreases a noise during recording and reproducing of the information.

Figure 6:
FIG. 6 is a schematic diagram showing the structure of an optical disk according to the present invention.
Figure 7:
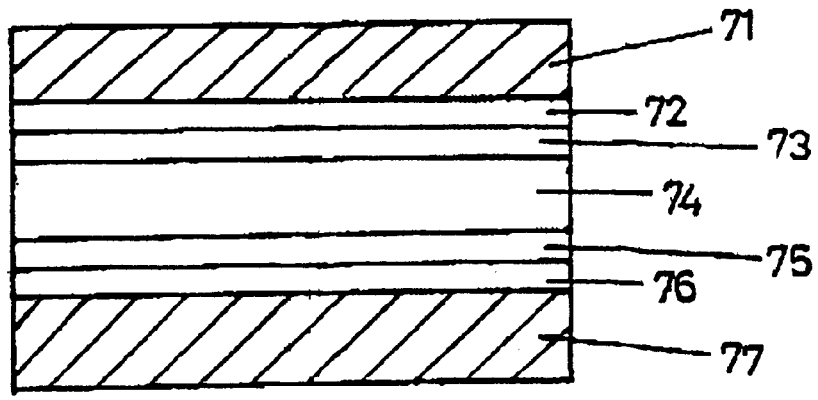
FIG. 7 is a schematic diagram showing the structure of a conventional SD.

Referring to FIG. 6, there is an optical disk having a common substrate 30 on the opposite sides of which tetralayer structures coated with a seal coating 39a and 39b is formed. Each of the tetralayer structures comprises a reflective film 34 and 38, a first dielectric film 33 and 37; a recording film 32 and 36 and a second dielectric film 31 and 35. These films are sequentially laminated on each side of the substrate. Accordingly, the optical disk of the present invention, unlike the conventional optical disk, is structured to have a common integral substrate which has a reflective film, a first dielectric film, a recording film, a second dielectric film and a protective layer sequentially formed on at least one side thereof. The thickness of these films is not confined and may be varied properly according to what is to be achieved.

The substrate is characterized in that it may have pits and/or grooves formed on both sides. The pits and grooves are not limited in length and may be formed by otherwise conventional processes. Various materials, for example, polycarbonate, APO(Amorphous Poly Olefin), PMMA (Polymethyl metacrylrate) and glass were used for substrate and polycarbonate is preferred due to its low price.

Information is recorded in the recording layer 32 and 36 which consists mainly of TbFeCo, TbFeCoCr, NdTbFeCo, NdFeCo, NdDyFeCo, GeSbTe, AgInSbTe, or GeAgInSbTe. Examples of the dielectric films 31, 33, 35 and 37 include SiN, SiO2, ZrO2, and ZnS—SiO2 with a preference of SiN. For the reflective films 34 and 38, Al, Al—Ti, Cu, Ag, Au or AgInPd is used, with a preference for Al. For the protective layer 39a and 39b, a resin such as polyacrylate, polycarbonate, APO(Amorphous Poly Olefin), PMMA (Polymethyl metacrylrate) and glass were used and polyacrylate is preferred.

Figure 8:
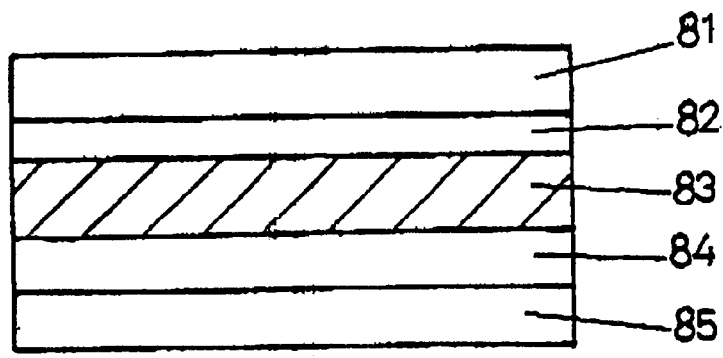
FIG. 8 is a schematic diagram showing the structure of a SD among an optical disk according to the present invention.

FIG. 8 shows a structure of an SD according to the present invention. Like the magneto-optical disk of the present invention, the SD has a common integral substrate 83. On one side of the integral substrate 83 a semi-transparent film 82 and a seal coating protective film 81 is sequentially formed, and on the other side of which a reflective film 84 and a seal coating protective film 85 is sequentially formed. In this embodiment, information is recorded in the pits and grooves formed on both sides, of the integral substrate 83. The semi-transparent film 82 is made of a material having a reflective rate of about 30 to 40, examples of which include SiN, SiO2, ZrO2 and Au with a preference for SiN. For the reflective film 84, a material with a reflective rate of 85% or more is employed, including Al and Al—Ti. Al is preferred. As in an optical disk, the thickness of these films is not confined.

Following are of processes for manufacturing the optical disk in accordance with the present invention. The processes will be described in detail in connection with the drawings.

Figure 1:
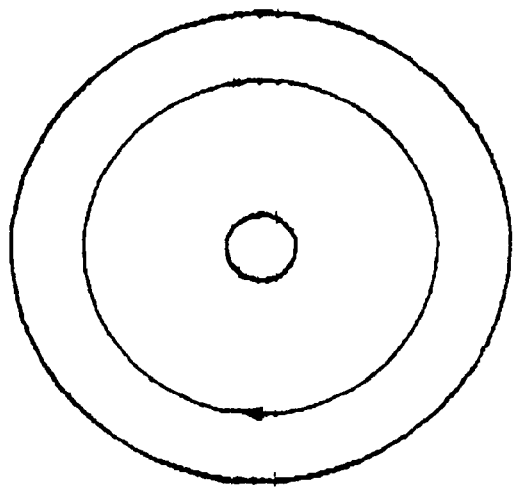
FIG. 1 is a schematic diagram showing a clockwise recording manner of laser beam recorder upon mastering process.
Figure 2:
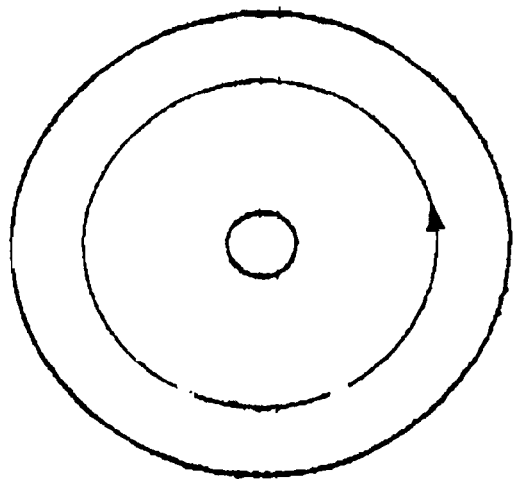
FIG. 2 is a schematic diagram showing a counterclockwise recording manner of laser beam recorder upon mastering process, according to the present invention.

A photoresist film on a master glass is exposed, as shown in FIG. 2, counterclockwise to a laser beam, to form the stamper. This counterclockwise direction is opposite to the conventional recording manner of laser beam recorder (hereinafter referred to as "LBR"). That is, during the mastering process for the conventional MOD, the recording manner of LBR is carried out in a clockwise direction, as shown in FIG. 1. Conventional MODs, consisting of two identical subunits bonded with each other, are usually designed in such a way that a laser beam for recording or reproducing information may be incident from the side surfaces of the substrates. -In contrast with conventional MODs, the optical disk according to the present invention is designed in such a way that information may be recorded or reproduced by incidence of a laser beam upon the groove face of the polycarbonate. This difference is owing, as delineated above, to the fact that the structure of the optical disk of the present invention is almost a reverse to that of the conventional MOD. Accordingly, the counterclockwise direction for the stamper is intended to make the optical disk of the present invention applicable to existing drives.

As shown in FIG. 4, two stampers 13a and 13b are respectively mounted to the fixed mold 14 and the moving mold 11. Thereafter, polycarbonate resin, APO(Amorphous Polyolefin), PMMA(Polymethylmetacrylrate) or glass is injected between the two stampers which are facing on each other, to form substrate 30 with desirable grooves and/or pits on its both sides. Two identical targets of a kind can be suspended to the two opposite sides of the chamber of a sputter M/C, each target in order to equally and simultaneously deposit material on both sides of the monolayer substrate 30. The substrate can be made in various molding processes, for example, compression molding, injection molding or compressive injection molding, according to the purpose of the resulting optical disk, and preferably in injection molding process. These film-forming processes may be carried out under various conditions according to the purpose of the resulting optical disk. Also, the thickness and components of the films to be formed may be properly changed depending on the purpose.

In the present invention, as shown in FIG. 6, an aluminum reflective film 34 and 38, a first dielectric film 33 and 37, an optical recording film 32 and 36 and a second dielectric film 31 and 35 are, in sequence, deposited, for example on each side of substrate 30, followed by the deposition of a protective layer 39a and 39b.

For SD, as shown in FIG. 8, a semi-transparent film 82 and a seal coating protective film are sequentially laminated on the integral substrate 83 beneath which a reflective film 84 and a seal coating protective film 85 are formed.

Accordingly, the present invention is an optical disk with an integral substrate which is capable of having the same data storage capacity as that of a conventional MOD with two polycarbonate substrates. That is, the optical disk according to the present invention can be of twice data storage density per substrate. The substrate of the conventional MOD is likely to be bent during the film-forming processes because the stress resulting from the stacking of the films exerts only on one of it. In contrast with the conventional substrate, the substrate of the present invention can have the films formed identically on its both sides and thus exert an identical quantity of the stress on the both sides such that the substrate is almost free of bending. Besides, a single substrate enables the present optical disk to be reduced in tact time into one third of that of the conventional MOD having two substrates and as well as to have twice data storage density per substrate, thereby improving productivity.

A better understanding of the present optical disk may be obtained in light of following examples which are set forth to illustrate, but are not to be construed to limit, the present invention.

EXAMPLE I

Photoresist on a master glass was recorded in a counterclockwise direction by a laser beam, to prepare a stamper. Two such stampers 13a and 13b were mounted to a fixed mold 14 and a moving mold 11 each, as shown in FIG. 4. Thereafter, polycarbonate resin was injected into a space between the two stampers, to form grooves and pits to both sides of the substrate. Targets were suspended on opposite sides of the chamber of a sputter M/C, to form a 400 Angstrom Al reflective film, a 200 Angstrom SiN dielectric film, a 200 Angstrom magnetic recording film and a 600 Angstrom SiN dielectric film on each side of the substrate 30, each side undergoing simultaneous operations. These film-forming processes were carried out under a pressure of about 10 mbar and at a power of about 2 kW. Thereafter, seal coating resin was spin-coated on the two outermost aluminum reflective surfaces, to form protective films less than 150 $\mu$m thick each.

EXAMPLE II

A SD was prepared as follows. As in Example I, stampers, each of which was different in information content, were prepared. Two stampers 13a and 13b, as shown in FIG. 4, were mounted to the fixed mold 14 and moving mold 11, respectively, in order to form information pits on both sides of the polycarbonate substrate. Targets were suspended, on both sides of the chamber of a sputter M/C with a pressure of 10 mbar and a power of about 2 kW, to form a 500 Angstrom SiN semi-transparent film 82 and a 500 Angstrom Al reflective film 84 on the opposite sides of the substrate, respectively, after which the seal coating resin was spin-coated to form a protective film 8–10 $\mu$m thick on the semi-transparent film and the reflective film.

COMPARATIVE EXAMPLE I

Figure 3:
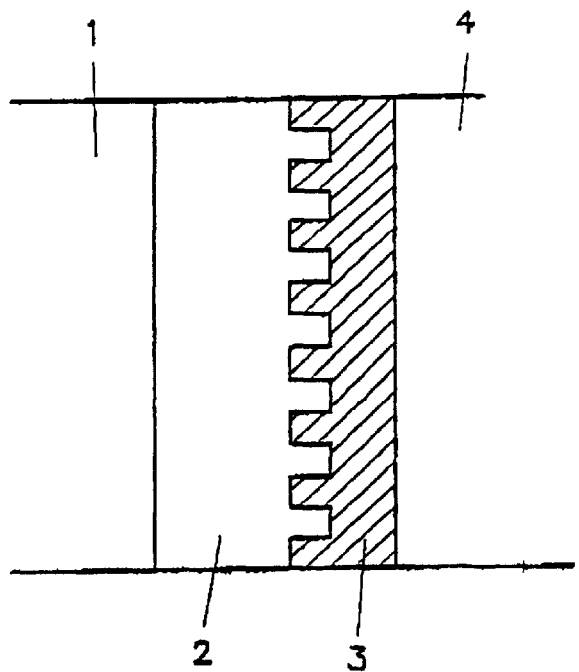
FIG. 3 is a schematic cross sectional view showing a conventional substrate for magneto-optical disk prepared by an injection molding process.

A stamper was mounted only to a fixed mold, as shown in FIG. 3. Using the mold, polycarbonate resin was subjected to injection molding, to give a substrate with grooves and pits formed on its one side. On this side, a 600 Angstrom thick SiN dielectric film, a 200 Angstrom thick magneto-optical recording film, a 200 Angstrom thick SiN dielectric film and a 400 Angstrom thick aluminum reflective film were formed, in sequence, using a dielectric current magnetron sputtering process. Two disks thus obtained were bonded with each other, in such a way that the outermost reflective film in one disk faces on its counterpart with a hot melt adhesive interposed therebetween. Finally, a hard coating resin was spin-coated on the entrance surfaces of the substrates, to form two outer hard coatings with a thickness of 3 $\mu$m. The optical disk prepared in Example I and Comparative Example I were tested for mechanical properties using a measuring apparatus commercially available from Ono Sokki Co. Ltd., Japan, identified as model No. LM-100A. While rotating the disks in a speed of 2,400 rpm, mechanical properties were measured at locations apart from the center by 30, 40, 50 and 60 mm by use of a reproducing power of 0.7 mW.

Averages of the measurements are given as shown in Table 1 below.

TABLE 1

| | Mechanical Properties of Optical Disk | | | |
|---|---|---|---|---|
| Acc Example No. | Axial deflect $\mu$m | Axial Acc m/sec$^2$ | Tilt mrad | Radial m/sec$^2$ |
| Com. Exam. I | 70–100 | 8–14 | 2–3 | 2–3 |
| Exam. I | 20–30 | 4–6 | 1 | 2–3 |
| Exam. II | 20–30 | 6–8 | 2 | 2–3 |

The optical disk prepared in Example I and Comparative Example I were mounted on respective drivers and tested for reliability in an incubator in which its temperature was maintained at 80° C. under a relative humidity of 85%. The results are given as shown in the following Table 2.

TABLE 2

Attachment State in Disk upon Incubation Test

| Example No. | Initial | 1 day | 5 days | 10 days | 20 days | 30 days |
|---|---|---|---|---|---|---|
| Com. Exam. I | 0 | 0 | 0 | X | — | — |
| Exam. I | 0 | 0 | 0 | 0 | 0 | 0 |
| Exam. II | 0 | 0 | 0 | 0 | 0 | 0 |

In this test, the hot melt adhesive flowed out the MOD obtained in Comparative Example I within 10 days and stuck to the cartridge.

As apparent from the examples and tables, the optical disk of the present invention is superior to conventional ones in mechanical properties and reliability. As for reliability, the present optical disk is prepared without using a bonding process, which completely overcomes the problem of outflowing of adhesive. The common single substrate results in twice the data storage density per substrate and capacitates the optical disk to improve in birefringence because of direct penetration of laser beam, not through substrate, into the recording film. In addition, since the substrate has multilayer films equally on its both sides, it is free of bending.

Further, the presence of only one substrate contributes to the lightening of the disk, which brings about accompanying effects including, for example, reduction in access time, saving of the bonding process and time in the spin coating, and reducing cost.

The present invention has been described in an illustrative manner, and it is to be understood that the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

What is claimed is:

1. An optical disk comprising
   an integral substrate having grooves and/or pits formed on at least one side surface, wherein said at least one side surface comprises
   a reflective film,
   a first dielectric film,
   an optical recording film,
   a second dielectric film, and
   a protective layer sequentially formed thereon.

2. The optical disk according to claim 1, wherein said recording film is selected from a group consisting of: TbFeCo, TbFeCoCr, NdTbFeCo, and NdFeCo.

3. The optical disk according to claim 1, wherein the first and second dielectric films is selected from a group consisting of: SiN, SiO2, and ZrO2.

4. The optical disk according to claim 1, wherein the reflective film is selected from a group consisting of Al, Al—Ti, Cu, Ag, and Au.

5. The optical disk according to claim 1, wherein said protective layer is selected from a group consisting of polyacrylate, polycarbonate, glass, PMMA and APO.

6. The optical disk according to claim 5, wherein said protective layer is polyacrylate.

7. The optical disk according to claim 1, wherein said resin seal coating has a thickness of less than 150 μm.

8. An optical disk comprising:
   an integral substrate having grooves and/or pits formed with a stamper on one side surface and not on another side surface, the side surface which does not have grooves and/or pits being formed with a dummy stamper, wherein said side surface having grooves and/or pits comprises
   a reflective film,
   a first dielectric film,
   an optical recording film,
   a second dielectric film, and
   a protective layer sequentially formed thereon.

9. The optical disk according to claim 8, wherein said recording film is selected from a group consisting of: TbFeCo, TbFeCoCr, NdTbFeCo, NdFeCo, NdDyFeCo, GeSbTe, AgInSbTe, and GeAgInSbTe.

10. The optical disk according to claim 8, wherein the first and second dielectric films is selected from a group consisting of: SiN, SiO2, ZrO2, and ZnS-SiO2.

11. The optical disk according to claim 8, wherein the reflective film is selected from a group consisting of Al, Al—Ti, Cu, Ag, Au and AgInPd.

12. The optical disk according to claim 8, wherein said protective layer is selected from a group consisting of polyacrylate, polycarbonate, glass, PMMA and APO.

13. The optical disk according to claim 8, wherein said protective layer is polyacrylate.

14. The optical disk according to claim 8 wherein said resin seal coating has a thickness of less than 150 μm.

15. An optical disk comprising:
   an integral substrate having grooves and/or pits formed on opposite side surfaces thereof without a bonding layer between said opposite side surfaces, wherein at least one of said opposite side surfaces comprises
   a reflective film,
   a first dielectric film,
   an optical recording film,
   a second dielectric film, and
   a protective layer sequentially formed thereon.

16. The optical disk according to claim 15, wherein said recording film is selected from a group consisting of: TbFeCo, TbFeCoCr, NdTbFeCo, NdFeCo, NdDyFeCo, GeSbTe, AgInSbTe, and GeAgInSbTe.

17. The optical disk according to claim 15, wherein the first and second dielectric films is selected from a group consisting of: SiN, SiO2, and Zn—S—SiO2.

18. The optical disk according to claim 15, wherein the reflective film is selected from a group consisting of: Al, Al—Ti, Cu, Ag, Au and AgInPd.

19. The optical disk according to claim 15, wherein said protective layer is selected from a group consisting of: polyacrylate, polycarbonate, glass, PMMA and APO.

20. The optical disk according to claim 15, wherein said protective layer is polyacrylate.

21. The optical disk according to claim 15, wherein said protective layer has a thickness of less than 150 μm.

22. The optical disk according to claim 1, wherein said recording film is selected from a group consisting of: NdDyFeCo, GeSbTe, AgInSbTe, and GeAgInSbTe.

23. The optical disk according to claim 1, wherein the first and second dielectric films is selected from a group consisting of: ZnS—SiO2.

24. The optical disk according to claim 1, wherein the reflective film is selected from a group consisting of: AgInPd.

* * * * *